(12) United States Patent
Evans (10) Patent No.: US 6,926,323 B2
(45) Date of Patent: Aug. 9, 2005

(54) BUMPER WITH INTEGRALLY FORMED ENERGY ABSORBER

(75) Inventor: Darin Evans, Wixom, MI (US)

(73) Assignee: Netshape International, LLC, Novi, MI (US)

( * ) Notice: Subject to any disclaimer, the term of this patent is extended or adjusted under 35 U.S.C. 154(b) by 0 days.

(21) Appl. No.: 10/944,233

(22) Filed: Sep. 17, 2004

(65) Prior Publication Data

US 2005/0029821 A1 Feb. 10, 2005

Related U.S. Application Data

(63) Continuation of application No. 10/681,806, filed on Oct. 8, 2003, which is a continuation of application No. 10/163,838, filed on Jun. 6, 2002, now Pat. No. 6,663,150.

(51) Int. Cl.⁷ .............................................. B60R 19/03
(52) U.S. Cl. ....................................... 293/120; 293/122
(58) Field of Search ................................ 293/120, 109, 293/125, 121, 122

(56) References Cited

U.S. PATENT DOCUMENTS

| | | | |
|---|---|---|---|
| 3,638,465 A | 2/1972 | Lickliter et al. | |
| 3,827,740 A | 8/1974 | Golze et al. | |
| 4,094,056 A | 6/1978 | Takeda et al. | |
| 4,165,113 A | 8/1979 | Casse | |
| 4,221,413 A | 9/1980 | Bonnetain | |
| 4,275,912 A | 6/1981 | Bayer | |
| 4,320,913 A | 3/1982 | Kuroda | |
| 4,328,986 A * | 5/1982 | Weller et al. ................ | 293/120 |
| 4,466,646 A * | 8/1984 | Delmastro et al. .......... | 293/120 |
| 4,533,166 A * | 8/1985 | Stokes ......................... | 293/120 |
| 4,621,399 A | 11/1986 | Qureshi et al. | |
| 4,830,416 A * | 5/1989 | Matsuoka .................... | 293/120 |
| 4,856,833 A | 8/1989 | Beekman | |
| 4,940,270 A * | 7/1990 | Yamazaki et al. .......... | 293/122 |
| 4,978,562 A | 12/1990 | Wycech | |
| 5,005,887 A | 4/1991 | Kelman | |
| 5,062,284 A | 11/1991 | Kubo et al. | |
| 5,092,512 A | 3/1992 | Sturrus et al. | |
| 5,106,137 A * | 4/1992 | Curtis ......................... | 293/109 |
| 5,124,186 A | 6/1992 | Wycech | |
| 5,219,197 A * | 6/1993 | Rich et al. .................. | 293/120 |
| 5,290,079 A * | 3/1994 | Syamal ....................... | 293/120 |
| 5,385,375 A * | 1/1995 | Morgan et al. ............. | 293/122 |
| 5,425,561 A * | 6/1995 | Morgan ...................... | 293/120 |
| 5,545,022 A | 8/1996 | Rosasco | |
| 5,545,361 A | 8/1996 | Rosasco | |
| 5,756,167 A | 5/1998 | Tamura et al. | |
| 5,926,930 A | 7/1999 | Tamura et al. | |
| 5,957,512 A * | 9/1999 | Inada et al. ................ | 293/120 |
| 5,984,389 A * | 11/1999 | Nuber et al. ............... | 293/109 |
| 6,065,786 A * | 5/2000 | Wheatley .................... | 293/125 |
| 6,082,792 A | 7/2000 | Evans et al. | |
| 6,096,402 A | 8/2000 | Tamura | |
| 6,165,588 A | 12/2000 | Wycech | |
| 6,217,089 B1 | 4/2001 | Goto et al. | |
| 6,276,105 B1 | 8/2001 | Wycech | |
| 6,345,577 B1 | 2/2002 | Cramer et al. | |
| 6,406,081 B1 * | 6/2002 | Mahfet et al. ............. | 293/120 |
| 6,609,740 B2 * | 8/2003 | Evans ......................... | 293/120 |
| 6,644,701 B2 * | 11/2003 | Weissenborn et al. ...... | 293/120 |
| 6,663,150 B1 * | 12/2003 | Evans ......................... | 293/120 |
| 6,669,251 B2 * | 12/2003 | Trappe ....................... | 293/120 |

(Continued)

*Primary Examiner*—Kiran B. Patel
(74) *Attorney, Agent, or Firm*—Price, Heneveld, Cooper, DeWitt & Litton, LLP (57) ABSTRACT

A bumper system comprising a metal tubular beam, an energy absorber and mounts. The metal tubular beam has a center section having front, rear, top, and bottom walls. The energy absorber includes a rail having a rear surface with a rearwardly-facing C-shaped recess mateably receiving the tubular beam therein, with the energy absorber being configured to crush and absorb impact energy prior to collapse of the tubular beam. The mounts engage a rear of the metal tubular beam.

15 Claims, 5 Drawing Sheets

U.S. PATENT DOCUMENTS

| | | | |
|---|---|---|---|
| 6,672,635 B2 * | 1/2004 | Weissenborn et al. | 293/120 |
| 6,685,243 B1 * | 2/2004 | Evans | 293/121 |
| 6,709,036 B1 * | 3/2004 | Evans | 293/120 |
| 2001/0017473 A1 | 8/2001 | Yamamoto | |
| 2001/0035658 A1 | 11/2001 | Anderson et al. | |
| 2003/0034661 A1 | 2/2003 | Gotanda et al. | |

* cited by examiner

BUMPER WITH INTEGRALLY FORMED ENERGY ABSORBER

CROSS-REFERENCE TO RELATED APPLICATION

This application is a continuation of U.S. patent application Ser. No. 10/681,806, entitled BUMPER WITH INTEGRALLY FORMED ENERGY ABSORBER, which was filed on Oct. 8, 2003, which is a continuation of U.S. patent application Ser. No. 10/163,838 entitled BUMPER WITH INTEGRATED ENERGY ABSORBER AND BEAM, which was filed on Jun. 6, 2002, now U.S. Pat. No. 6,663,150.

BACKGROUND

The present invention relates to vehicle bumper systems, and more particularly relates to a bumper system having an integrated energy absorber and beam, and also relates to novel beam constructions such as those that are shaped for engagement with mating energy absorbers.

Bumper systems using integrated energy absorber and bumper beam arrangements are desired to improve assembly of bumper systems to vehicles, to minimize the number and types of mechanical fasteners overall, and to simplify tooling. In particular, it is desirable to provide a design where the beam and energy absorber can be assembled off-line of the main vehicle assembly line into a unitary subassembly, and then manipulated as a unit for attachment to the vehicle. Also, it is desirable to attach fascia to the subassembly, and to integrate and attach other components to the subassembly, such as headlights, grilles, and other functional and ornamental components. At the same time, impact durability and enhanced energy absorption continue to be high priority items in bumper systems, and accordingly, any subassembly should preferably not detract from the same.

In addition to the above, many vehicle manufacturers and some insurance groups and government entities are pressing for improved crashworthiness of vehicles, and also for bumper systems that will provide for better pedestrian safety. Longer bumper strokes with lower initial energy absorption rates have the possibility of satisfying these desires, but this can result in energy absorbers that are physically larger in size than present bumper systems, and that are not easy to package and carry at a front of the vehicle. Thus, new integrated bumper systems are desired to deal with the conflicting functional and design requirements.

Improvements are also desired in rear bumper systems on vehicles. In particular, vehicle manufacturers are looking increasingly at energy absorbers for rear bumper systems that are not dissimilar in shape and function to energy absorbers for front bumper systems. However, the energy absorber of any such rear bumper system must be integrated into the bumper system such that it does not interfere with other functional and aesthetic requirements at a rear of the vehicle. For example, many rear bumper systems include a step, and/or are adapted to support a ball hitch for hauling a trailer.

Accordingly, bumper systems are desired solving the aforementioned problems and having the aforementioned advantages.

SUMMARY OF THE INVENTION

One aspect of the present invention is to provide a bumper system comprising a metal tubular beam, an energy absorber and mounts. The metal tubular beam has a center section having front, rear, top, and bottom walls. The energy absorber includes a rail having a rear surface with a rearwardly-facing C-shaped recess mateably receiving the tubular beam therein, with the energy absorber being configured to crush and absorb impact energy prior to collapse of the tubular beam. The mounts engage a rear of the metal tubular beam.

Another aspect of the present invention is to provide a bumper system comprising a metal tubular beam, a polymeric energy absorber and mounts. The polymeric energy absorber has a rear surface with a recess mateably receiving the tubular beam, with the energy absorber being configured to crush and absorb impact energy prior to collapse of the tubular beam. The mounts engage a rear of the metal tubular beam. The energy absorber includes enlarged structural corner sections that extend outboard of the mounts and outboard of outer ends of the beam for providing impact structure to a corner of the vehicle outboard of the beam and mounts. The corner sections form at least one honeycomb-shaped structure for absorbing impact energy during a vehicle crash, with the corner sections further providing a top surface configured to support a force placed thereon.

Yet another aspect of the present invention is to provide a bumper system comprising a metal tubular beam, an energy absorber and mounts. The energy absorber has a rear surface with a recess mateably receiving the tubular beam, with the energy absorber being configured to crush and absorb impact energy prior to collapse of the tubular beam. The mounts engage a rear of the metal tubular beam. The energy absorber includes enlarged structural corner sections that extend outboard of the mounts and outboard of outer ends of the beam for providing impact structure to a corner of the vehicle outboard of the beam and mounts. The corner sections include a portion located proximate the mounts, with the corner sections being configured to flex, engage and slide on a side of the mounts during a corner impact by an object directed along a line angled with respect of a length of the mounts, whereby the object bounces sideways off the corner section in a direction parallel to a longitudinal direction of the energy absorber upon the corner impact.

In yet another aspect of the present invention, a bumper system comprising a metal tubular beam, an energy absorber and mounts is provided. The metal beam has a center section. The energy absorber includes a rail having the beam therein, with the energy absorber being configured to crush and absorb impact energy prior to collapse of the beam. The mounts engage a rear of the metal beam. The energy absorber includes a top section connected to a top portion of the rail and a bottom section connected to a bottom portion of the rail. The top section has an upwardly angled top first segment extending from the rail and a forwardly extending top second segment extending from the first segment. The bottom section has a downwardly angled bottom first segment extending from the rail and a forwardly extending bottom second segment extending from the first segment. The upwardly angled top first segment folds rearwardly over a top face of the rail during a front impact of the forwardly extending top second segment. The downwardly angled bottom first segment folds rearwardly over a bottom face of the rail during a front impact of the forwardly extending bottom second segment.

Another aspect of the present invention is to provide a bumper system for a vehicle having a passenger compartment comprising a tubular beam, wherein an energy absorber and mounts are provided. The tubular bumper beam includes a center section, end sections, and bent interconnecting sections that interconnect each end section with an end of the center section, with the center section being at least 25% of a length of the bumper beam and defining a longitudinal primary centerline, and the end sections being at least 15% of the length and each defining a secondary centerline that extends parallel the primary centerline. The energy absorber has at least one recess shaped to receive a portion of the tubular bumper beam, with the energy absorber being configured to crush and absorb impact energy prior to collapse of the tubular beam. The mounts are adapted for attachment to a vehicle and are attached to the end sections. The secondary centerline is spaced horizontally from the primary centerline when in a vehicle-mounted position, with the center section being located partially between the mounts and closer to the passenger compartment than the end sections. The energy absorber includes enlarged structural corner sections that extend outboard of the mounts and outboard of the outer ends of the beam for providing impact structure to a corner of the vehicle outboard of the beam and mounts.

These and other features, advantages, and objects of the present invention will be further understood and appreciated by those skilled in the art by reference to the following specification, claims and appended drawings.

An advantage of the present bumper systems is that some of the traditional front-end support structure can be simplified or eliminated. For example, the present inventive bumper system can include an energy absorber with portions that support the front-of-vehicle fascia in areas in front of the vehicle hood. This allows the front end support structure of the vehicle to be simplified, such as by eliminating fascia-supporting struts, by eliminating forwardly-extending flanges on the radiator cross support, by reducing the strength requirements on the radiator cross support and/or by eliminating or reducing strength requirements on a vehicle's front end panel.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
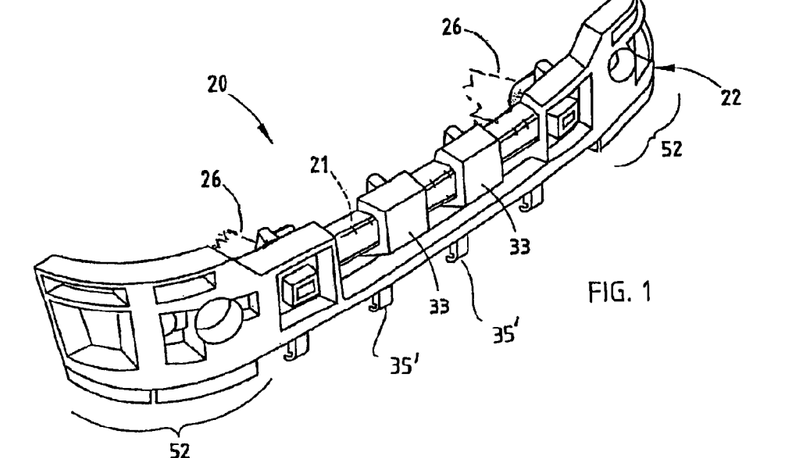
FIG. 1 is a perspective view of a bumper system embodying the present invention, including an energy absorber and a tubular beam with flattened ends positioned within a rear-facing recess in the energy absorber.

A bumper system 20 (FIG. 1) includes a beam 21 with a tubular center section and flattened end sections 23 and 24, and a molded energy absorber 22 adapted to nestingly receive the beam 21 to form a unitary subassembly that can be handled and assembled as a unit to a vehicle. The flattened end sections 23 and 24 form vertically enlarged attachment members or "hands" on each end of the beam 21 that engage mating flat surfaces on the energy absorber 22. Mounts 26 abuttingly engage a rear of the flattened end sections 23 and 24, and fasteners 27 extend through the energy absorber 22 and the flattened end sections 23 and 24 to secure the tubular beam 21 and energy absorber 22 to the mounts 26. It is contemplated that the term "mount" as used herein includes a rail extending from a vehicle frame, or similar structural frame component.

Figure 2:
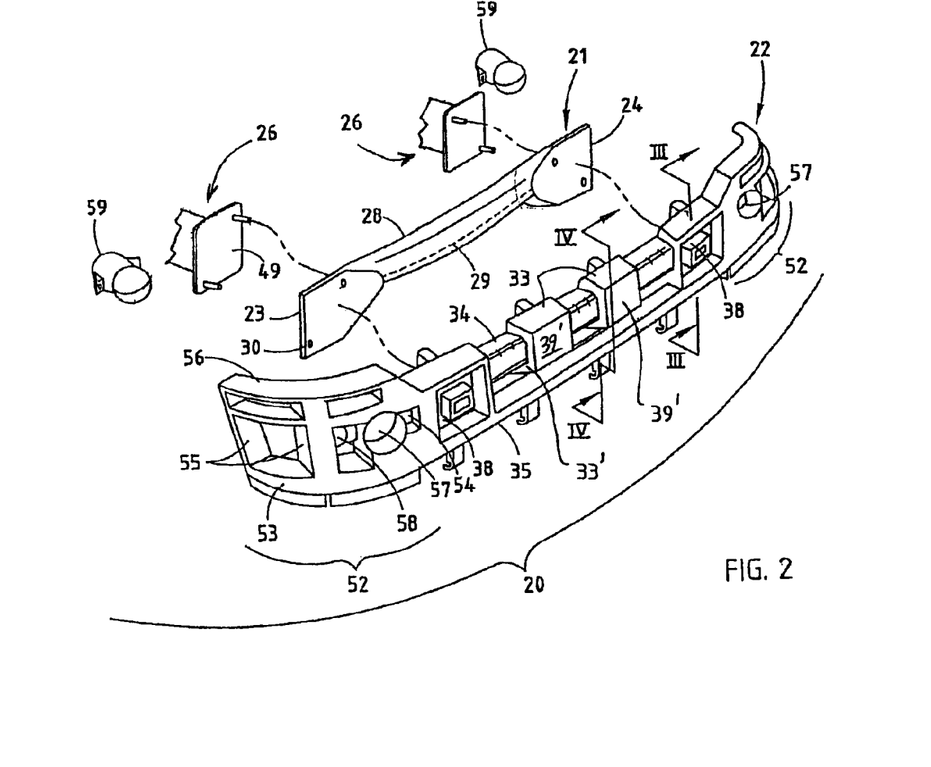
FIG. 2 is an exploded view of FIG. 1.

The beam 21 (FIG. 1) is described in sufficient detail below for an understanding of the present invention by persons skilled in this art. Nonetheless, if additional discussion is desired, the reader's attention is directed to application Ser. No. 09/822,658, filed Nov. 1, 2001, entitled METHOD OF MANUFACTURING A ONE-PIECE TUBULAR DOORBEAM, which issued as U.S. Pat. No. 6,643,931, and application Ser. No. 09/904,066, filed Mar. 30, 2002, entitled ROLL-FORMED AND STAMPED DOORBEAM, which issued as U.S. Pat. No. 6,622,450, and also U.S. Pat. 5,092,512, issued Mar. 3, 1992, entitled METHOD OF ROLLFORMING AN AUTOMOTIVE BUMPER, the entire contents of all of which are incorporated herein in their entireties. Different vehicle mounts can be used with the present invention. The mounts illustrated in FIG. 2 are described in sufficient detail below for an understanding by persons skilled in the art. Nonetheless, if additional discussion is desired, the reader's attention is directed to application Ser. No. 09/964,914, filed Sep. 27, 2001, entitled BUMPER CRUSH TOWER WITH RINGS OF VARIED STRENGTH, which issued as U.S. Pat. No. 6,648,384, the entire contents of which is incorporated herein in its entirety.

Beam 21 (FIG. 2) includes a tubular center section 28 having a square cross section defined by front, rear, top, and bottom walls. The beam 21 is rollformed to a desired tubular shape, welded along a weld bead 29 located at a middle of the rear wall, and then swept into a curvilinear shape that matches a front end (or rear end) of a selected model vehicle. It is noted that different cross sections can be used, if desired. The weld bead 29 stops short of an end of the beam 21, and about 6 to 8 inches of an end of the walls are reformed and "opened up" to a relatively coplanar flat condition to form the flattened end sections 23 and 24. A pattern of holes 30 are formed in the flattened end sections 23 and 24, which correspond to attachment holes in the mount 26.

Energy absorber 22 (FIG. 2) includes an injection-molded member made from a suitable non-foam polymeric material having good properties for absorbing energy upon impact, such as Xenoy material. The non-foam material substantially forms the structure of energy absorber 22, including box-shaped sections 33, which are molded along rail 34 at strategic locations for improved impact properties, as described below. The box-shaped sections 33 include vertical sidewalls 33' and top and bottom walls 33" that combine with front wall 39' to form a hollow internal cavity.

Figure 4:
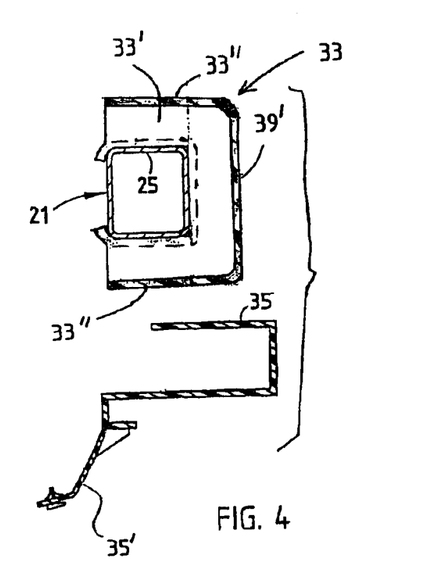

The center section of the energy absorber 22 includes horizontal upper and lower rails 34 and 35, both of which have rearwardly-facing U-shaped cross sections. The upper rail 34 defines a large portion of the rearwardly-facing recess 25 (FIG. 4), which is shaped to closely receive the center tubular section of the beam 21. The box-shaped sections 33 are molded onto top, front and bottom surfaces of the upper rail 34 at strategic locations along its length. Two such sections 33 are shown, but more or less can be used. The sections 33 provide improved energy absorbing characteristics to the bumper system 20, and further the sections 33 have an upper surface shaped to support the vehicle front fascia 36, which is typically a low stiffness or TPO material that requires support against the forces of gravity.

Figure 3:
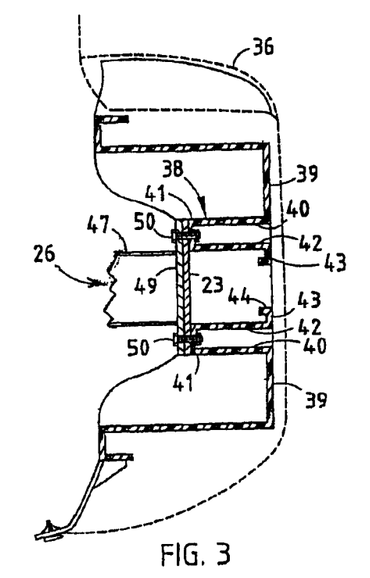
FIGS. 3 and 4 are cross sections taken along lines III—III and IV—IV in FIG. 2.

The energy absorber 22 (FIG. 2) also includes mounting sections 38 that form integrated crush boxes over the mounts 26 at each end of the center section 28. The mounting sections 38 (FIG. 3) each include a rectangular ring-shaped planar outer front wall 39, rearwardly-extending walls 40 forming an open "C" shape that extends rearwardly from the front wall 39, a rectangular ring-shaped planar rear wall 41 that extends from the rearwardly-extending walls 40, forwardly-extending walls 42 that form a square tube shape that extends forwardly from the rear wall 41, a rectangular ring-shaped planar inner front wall 43 that extends from the forwardly-extending walls 42, and an interior stiffener flange 44 that extends rearwardly from the inner front wall 43. Additional stiffening webs can be extended between the rearwardly-extending walls 40 and the forwardly-extending walls 42 as needed for stiffness and structure in the energy absorber 22. A plurality of legs 35' extend below the lower rail 35, such as for supporting a bottom of the TPO fascia on a front of the vehicle.

The flattened end section 23 (and 24) (FIG. 3) includes a flat front surface that mateably engages the flat rear surface of the planar rear wall 41. The mount 26 includes a tubular section 47 (e.g. a crush tower for optimal energy absorption in front impact), a rear plate shaped for connection to a vehicle, such as to vehicle frame members, and a front plate 49 shaped to mateably engage a flat rear surface on the end section 23 (and 24). Fasteners, such as bolts 50 are extended through aligned holes in the planar rear wall 41, in the flattened end sections 23 (and 24), and the front plate 49. Notably, the tubular portion of beam 21 (i.e. center section 28) extends short of the mounts 26 (see FIG. 5), and further the flattened end sections 23 (and 24) extend only to the outer edges of the mounts 26, for reasons discussed below.

The energy absorber 22 includes corner sections 52 (FIGS. 2 and 5) having an apertured front wall 53, an apertured rear wall 54, and reinforcing walls 55 that extend between the front and rear walls 53 and 54 for structural support. The front wall 53 curves rearwardly at its outer edge to form an aerodynamic shape at a front of the vehicle fenders. Further, the reinforcing walls 55 include a top wall 56 shaped to structurally support portions of an RRIM fascia in the area of a vehicle front fender. Also, the corner section 52 includes a tubular canister portion 57 and canister-mounting structure 58 for adjustably securely supporting a fog lamp assembly 59 (and/or a turn signal assembly).

Figure 5:
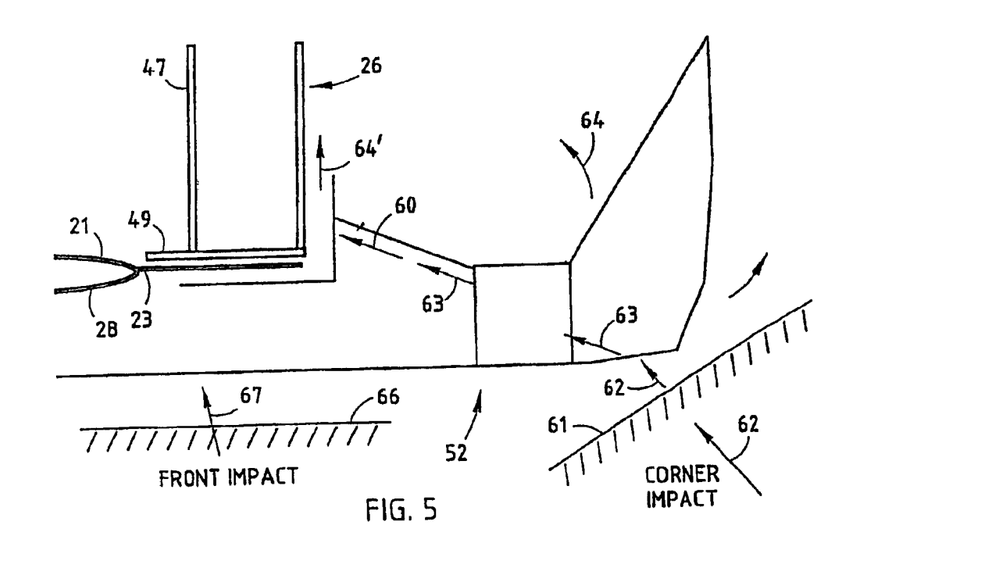
FIG. 5 is a fragmentary top schematic view of the bumper system of FIG. 1.

As shown in FIG. 5, the corner section(s) 52 include a rearwardly-extending box section 60 that is outboard of the mount 26 and positioned adjacent an end of the flattened end sections 23 (and 24). During a corner impact by an object 61, forces are transmitted along lines 62 and 63 into the corner section 52. The angled forces 63 are directed through the box section 60 at an angle toward a side surface of the mount 26. The angled forces cause the corner section 52 to bend rearwardly in direction 64, sliding rearwardly slightly along line 64' on the mount 26 (depending on the magnitude of the forces 63). This action tends to allow the angled forces to relieve themselves, and also tends to cause the object 61 to bounce sideways off the vehicle bumper system 20.

When an object 66 is struck in a front impact directly in-line with the mounts 26, the forces 67 are transmitted directly against the mount 26 in a manner permitting the mount 26 to absorb forces in a telescoping manner like it historically is designed. (I.e. the forces are linear and permit the tubular section 47 to telescopingly crush and collapse in a predictable manner.) When the bumper system 20 is struck in a center area between the mounts 26, the impact is primarily transmitted linearly into the mounts 26, due to the strength of the beam 21. Nonetheless, it is noted that with the present beam 21, some bending may occur, depending on a width of the impact area on the bumper system 20 and how nearly it is perfectly centered on the bumper system 20.

Figure 6:
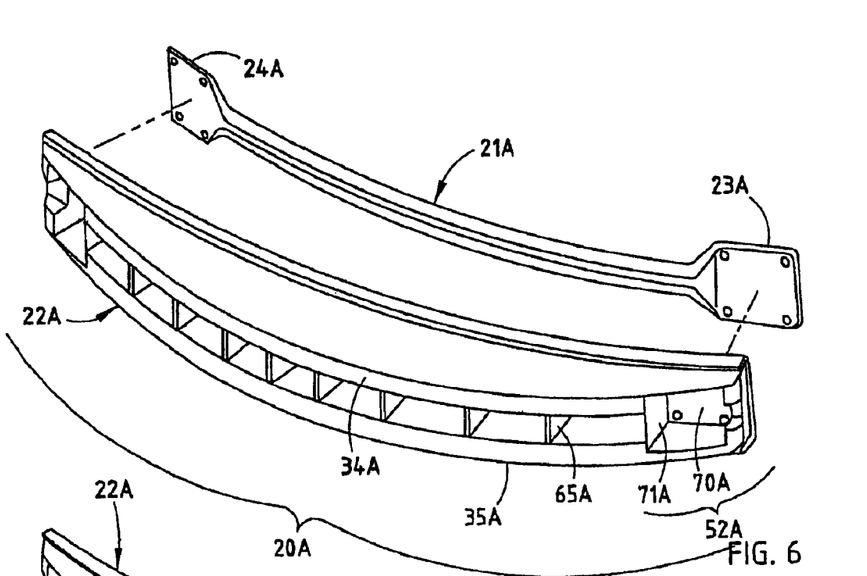
FIG. 6 is an exploded perspective view of another bumper system embodying the present invention.
Figure 7:
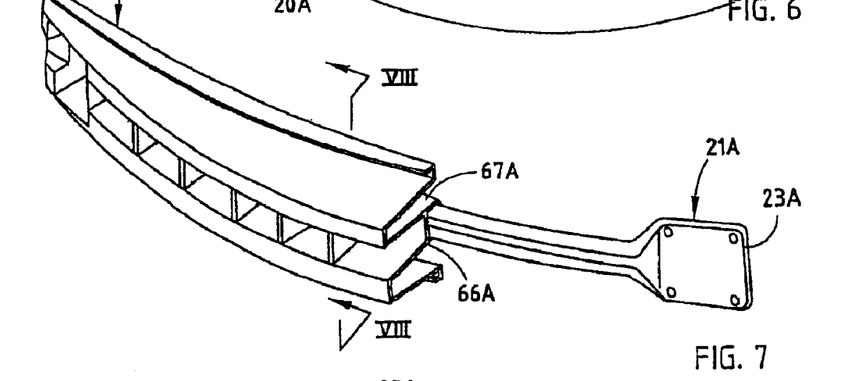
FIG. 7 is a perspective view of the bumper system of FIG. 6, a portion of the energy absorber being removed to better show engagement of the energy absorber with the beam.
Figure 8:
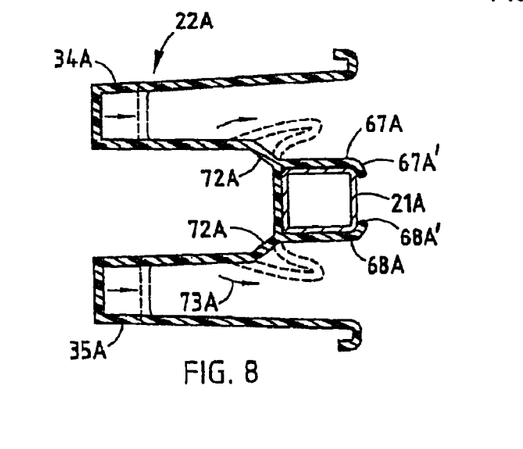
FIG. 8 is a cross section taken along line VIII—VIII in FIG. 7.

In the modified bumper system 20A (FIGS. 6–8), a beam 21A similar to beam 21 is provided, and a "longer stroke" energy absorber 22A is attached to its face. The energy absorber 22A includes upper and lower U-shaped rails 34A and 35A that open rearwardly. The rails 34A and 35A are connected by vertical webs 65A that extend fore/aft, and by a rear wall 66A that extends across a back of the energy absorber 22A. Flanges 67A and 68A extend rearwardly from the rear wall 66A. The flanges 67A and 68A engage and cover top and bottom walls of the beam 21A, and include fingers 67A' and 68A' for snap-locking onto the beam 21A for temporary securement of the energy absorber 22A to the beam 21A. In energy absorber 22A, the corner sections 52A also form the mounting section of the energy absorber 22A. Specifically, the corner sections 52A include a flat rear wall 70A, and perpendicular walls 71A forming a box around the flat rear wall 70A. The end section 23A (and 24A) of the beam 21A engage a rear surface of the flat rear wall 70A, and fasteners (i.e. bolts) are extended through aligned holes in the flat rear wall 70A, the flattened sections 23A (and 24A), and the front plate of the mount (26) to which it is attached.

A rear "root" portion 72A of the inner wall of the rails 34A and 35A is offset slightly from the flanges 67A and 68A (FIG. 8), and also is offset from the corresponding top and bottom walls of the beam 21A. Upon front impact, the rails 34A and 35A are driven rearwardly. Due to the stiffness of the beam 21A, this causes the "root" portion 72A of the energy absorber 22A to buckle and fold onto itself and onto the flanges 67A and 68A, as shown by arrows 73A. The result is a much more predictable and "softer" impact. At such time as the energy absorber 22A is completely crushed, forces from the impact are directly transmitted to the beam 21A, providing a force versus deflection force curve that increases sharply over the initial force versus deflection curve.

Figure 9:
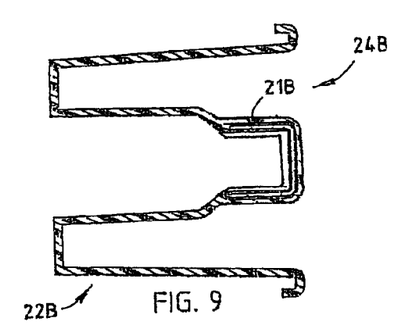
FIG. 9 is a cross section of an alternative bumper system, the cross section being similar to FIG. 8.
Figure 9A:
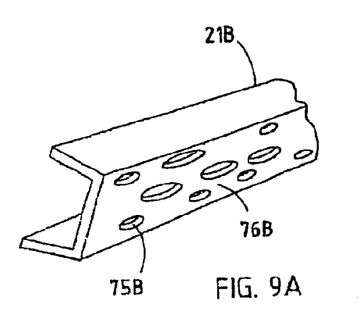
FIG. 9A is a fragmentary perspective view of an apertured version of the U-beam shown in FIG. 9.
Figure 10:
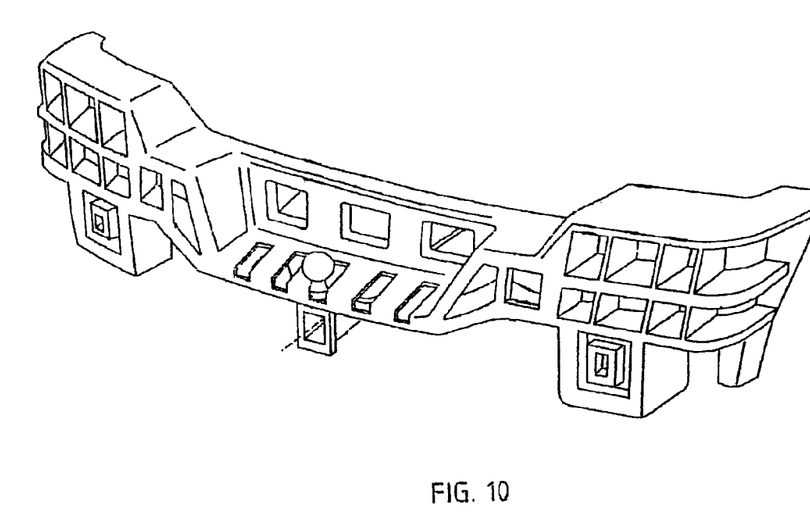
FIG. 10 is a perspective view of a rear bumper system embodying the present invention.
Figure 11:
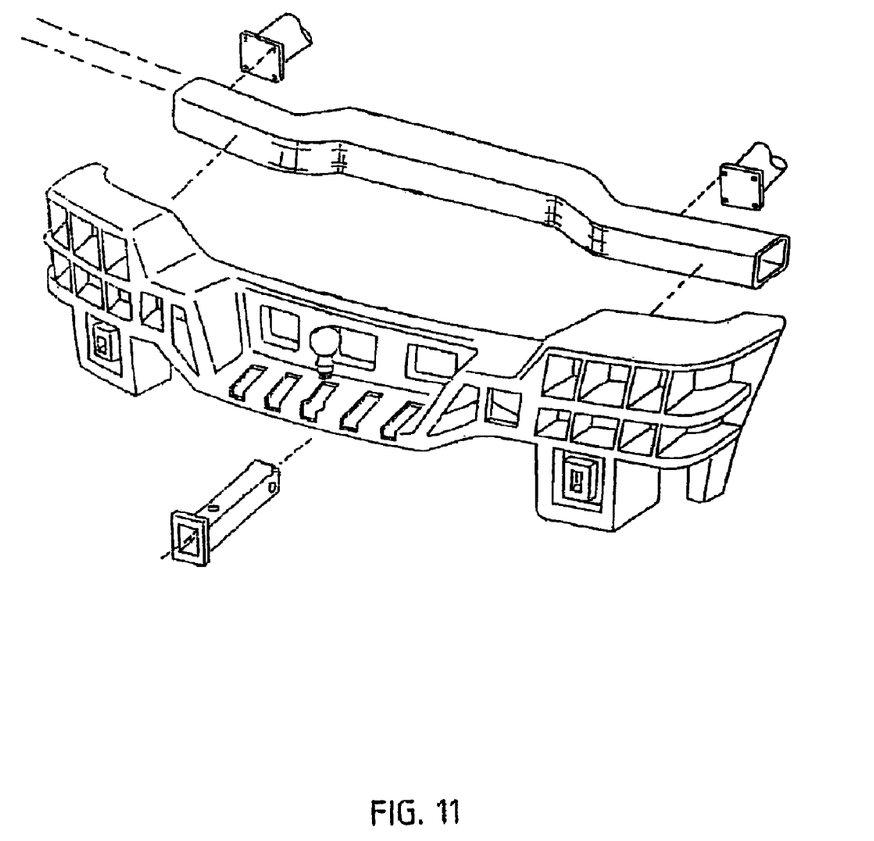
FIG. 11 is an exploded view of FIG. 10.

The bumper system 20B (FIG. 9) is not unlike the bumper system 20A (FIGS. 6–7), but in system 20B the beam 21B is U-shaped (i.e. is not tubular), and further it is insert-molded into a center of the energy absorber 22B. In the bumper system 20B, the beam 21B includes a plurality of apertures or holes to allow the plastic material of the energy absorber to flow through and interlock with the metal beam 21B, thus providing better bonding and preventing de-lamination. It is noted that the apertures 75B may reduce a bending strength of the beam 21B, depending on their location. The illustrated apertures 75B are located only on the vertical flange 76B of the beam 21B, such that they do not greatly affect bending strength in a direction parallel an impact force. Nonetheless, the location and shape of the apertures 75B can be a desirable thing by helping distribute and relieve stress in some specific vehicle applications.

It is noted that a strength of the tubular portion of the beam 21B (or beams 21A or 21) can be substantially increased by press-fitting within the tubular portion an internal energy absorber, such as is illustrated in FIGS. 1–2 and 10–11. The internal energy absorber tends to reduce a tendency of the beam to prematurely kink or bend, resulting in a consistently higher and more predictable energy of absorption during impact.

It is to be understood that variations and modifications can be made on the aforementioned structure without departing from the concepts of the present invention, and further it is to be understood that such concepts are intended to be covered by the following claims unless these claims by their language expressly state otherwise.

I claim:

1. A bumper system comprising:
   a metal tubular beam;
   a polymeric energy absorber having a rear surface with a recess mateably receiving the tubular beam, the energy absorber being configured to crush and absorb impact energy prior to collapse of the tubular beam;
   mounts engaging a rear of the metal tubular beam;
   wherein the energy absorber includes enlarged structural corner sections that extend outboard of the mounts and outboard of outer ends of the beam for providing impact structure to a corner of the vehicle outboard of the beam and mounts; and
   wherein the corner sections form at least one honeycomb-shaped structure for absorbing impact energy during a vehicle crash, the corner sections further providing a top surface configured to support a force placed thereon.

2. The bumper system defined in claim 1, wherein the corner sections include an apertured front wall, an apertured rear wall and reinforcing walls extending between the front wall and the rear wall.

3. The bumper system defined in claim 2, wherein the front wall and the rear wall are substantially vertical and the reinforcing walls are substantially horizontal.

4. The bumper system defined in claim 3, wherein the top surface is located on a topmost one of the reinforcing walls.

5. A bumper system comprising:
   a metal tubular beam;
   an energy absorber having a rear surface with a recess mateably receiving the tubular beam, the energy absorber being configured to crush and absorb impact energy prior to collapse of the tubular beam;
   mounts engaging a rear of the metal tubular beam;
   wherein the energy absorber includes enlarged structural corner sections that extend outboard of the mounts and outboard of outer ends of the beam for providing impact structure to a corner of the vehicle outboard of the beam and mounts; and
   wherein the corner sections include a portion located proximate the mounts, the corner sections being configured to flex, engage and slide on a side of the mounts during a corner impact by an object directed along a line angled with respect of a length of the mounts, whereby the object bounces sideways off the corner section in a direction parallel to a longitudinal direction of the energy absorber upon the corner impact.

6. A bumper system comprising:
   a metal beam with a center section;
   an energy absorber including a rail having the beam therein, the energy absorber being configured to crush and absorb impact energy prior to collapse of the beam; and
   mounts engaging a rear of the metal beam;
   the energy absorber including a top section connected to a top portion of the rail and a bottom section connected to a bottom portion of the rail;
   the top section having an upwardly angled top first segment extending from the rail and a forwardly extending top second segment extending from the top first segment;
   the bottom section having a downwardly angled bottom first segment extending from the rail and a forwardly extending bottom second segment extending from the bottom first segment;
   wherein the upwardly angled top first segment folds rearwardly over a top face of the rail during a front impact of the forwardly extending top second segment; and
   wherein the downwardly angled bottom first segment folds rearwardly over a bottom face of the rail during a front impact of the forwardly extending bottom second segment.

7. The bumper system defined in claim 6, wherein die metal beam is tubular and includes front, rear, top, and bottom walls, and die rail has a rear surface with a recess mateably receiving the tubular beam therein.

8. The bumper system defined in claim 6, wherein the energy absorber includes the rail encapsulating the tubular beam.

9. The bumper system defined in claim 8, wherein the rail is U-shaped.

10. The bumper system defined in claim 9, wherein a front wall of the rail includes apertures therethrough.

11. A bumper system for a vehicle having a passenger compartment, comprising:
    a tubular bumper beam that includes a center section, end sections, and bent interconnecting sections that interconnect each end section with an end of the center section, the center section being at least 25% of a length of the bumper beam and defining a longitudinal primary centerline, and die end sections being at least 15% of the length and each defining a secondary centerline that extends parallel the primary centerline;
    an energy absorber with at least one recess shaped to receive a portion of the tubular bumper beam, the energy absorber being configured to crush and absorb impact energy prior to collapse of the tubular beam; and
    mounts adapted for attachment to a vehicle and that are attached to the end sections, the secondary centerline being spaced horizontally from the primary centerline when in a vehicle-mounted position, with the center section being located partially between the mounts and closer to the passenger compartment than the end sections, the energy absorber including enlarged structural corner sections that extend outboard of the mounts and outboard of the outer ends of the beam for providing impact structure to a corner of die vehicle outboard of the beam and mounts.

12. The bumper system of claim 1, wherein:
    the metal tubular beam includes a center section;
    the energy absorber comprises a rail having the metal tubular beam therein;
    the energy absorber includes a top section connected to a lop portion of the rail and a bottom section connected to a bottom portion of the rail;
    the top section has an upwardly angled top first segment extending from die rail and a forwardly extending top second segment extending from the first segment;
    the bottom section has a downwardly angled bottom first segment extending from the rail and a forwardly extending bottom second segment extending from the first segment;

the upwardly angled top first segment folds rearwardly over a top face of the rail during a front impact of the forwardly extending top second segment; and the downwardly angled bottom first segment folds rearwardly over a bottom face of the rail during a front impact of the forwardly extending bottom second segment.

13. The bumper system defined in claim 1, wherein:

the tubular beam further includes a center section, end sections and bent interconnecting sections that interconnect each end section with an end of the center section, the center section being at least 25% of a length of the beam and defining a longitudinal primary centerline, and the end sections being at least 15% of the length and each defining a secondary centerline that extends parallel the primary centerline;

the mounts are adapted for attachment to a vehicle and are attached to the end sections, the secondary centerline being spaced horizontally from the primary centerline when in a vehicle-mounted position, with the center section being located partially between the mounts and closer to a passenger compartment of the vehicle than the end sections.

14. The bumper system of claim 5, wherein:

the metal tubular beam includes a center section;

the energy absorber comprises a rail having the metal tubular beam therein;

the energy absorber includes a top section connected to a top portion of the rail and a bottom section connected to a bottom portion of the rail;

the top section has an upwardly angled top first segment extending from the rail and a forwardly extending top second segment extending from the first segment;

the bottom section has a downwardly angled bottom first segment extending from the rail and a forwardly extending bottom second segment extending from the first segment;

the upwardly angled top first segment folds rearwardly over a top face of the rail during a front impact of the forwardly extending top second segment; and the downwardly angled bottom first segment folds rearwardly over a bottom face of the rail during a front impact of the forwardly extending bottom second segment.

15. The bumper system defined in claim 1, wherein:

the tubular beam further includes a center section, end sections and bent interconnecting sections that interconnect each end section with an end of the center section, the center section being at least 25% of a length of the beam and defining a longitudinal primary centerline, and the end sections being at least 15% of the length and each defining a secondary centerline that extends parallel the primary centerline;

the mounts are adapted for attachment to a vehicle and are attached to the end sections, the secondary centerline being spaced horizontally from the primary centerline when in a vehicle-mounted position, with the center section being located partially between the mounts and closer to a passenger compartment of the vehicle than the end sections.

* * * * *

UNITED STATES PATENT AND TRADEMARK OFFICE
CERTIFICATE OF CORRECTION

PATENT NO. : 6,926,323 B2
DATED : August 9, 2005
INVENTOR(S) : Darin Evans

It is certified that error appears in the above-identified patent and that said Letters Patent is hereby corrected as shown below:

Column 8,
Lines 17 and 19, "die" should be -- the --.
Lines 36 and 52, "die" should be -- the --.
Line 59, "lop" should be -- top --.
Line 62, "die" should be -- the --.

Signed and Sealed this

Seventh Day of March, 2006

JON W. DUDAS
*Director of the United States Patent and Trademark Office*